United States Patent
Itoh et al.

(10) Patent No.: US 8,675,065 B2
(45) Date of Patent: Mar. 18, 2014

(54) VIDEO MONITORING SYSTEM

(75) Inventors: Masaya Itoh, Hitachinaka (JP); Masanori Miyoshi, Mito (JP); Masato Kazui, Hitachi (JP); Hiromasa Fujii, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 1061 days.

(21) Appl. No.: 12/540,549

(22) Filed: Aug. 13, 2009

(65) Prior Publication Data

US 2010/0141763 A1  Jun. 10, 2010

(30) Foreign Application Priority Data

Dec. 4, 2008  (JP) ................................. 2008-309226

(51) Int. Cl.
*H04N 13/04* (2006.01)
*G06F 15/16* (2006.01)

(52) U.S. Cl.
USPC ........................... 348/143; 709/236; 709/247

(58) Field of Classification Search
USPC ........................... 348/143; 709/236, 246–247
See application file for complete search history.

(56) References Cited

U.S. PATENT DOCUMENTS

| | | | | |
|---|---|---|---|---|
| 7,447,332 B2 * | 11/2008 | Horii et al. | ..................... | 348/143 |
| 7,936,372 B2 * | 5/2011 | Murakami et al. | ......... | 348/207.1 |
| 8,125,521 B2 * | 2/2012 | Itokawa | ........................ | 348/143 |
| 2006/0045381 A1 * | 3/2006 | Matsuo et al. | ................ | 382/276 |
| 2006/0182357 A1 * | 8/2006 | Liu et al. | ....................... | 382/239 |

FOREIGN PATENT DOCUMENTS

| | | |
|---|---|---|
| JP | 2003-009130 | 1/2003 |
| JP | 2003-242594 | 8/2003 |
| JP | 2004-200739 | 7/2004 |
| JP | 2007-066124 | 3/2007 |
| JP | 2007-293558 | 11/2007 |

* cited by examiner

*Primary Examiner* — Patrice Winder
(74) *Attorney, Agent, or Firm* — Antonelli, Terry, Stout & Kraus, LLP.

(57) ABSTRACT

A video monitoring system, comprises a camera, and a monitor apparatus, to which video data from the camera is transmitted, wherein the camera comprises a video obtaining unit for obtaining a signal from an image pickup device, a camera image recognizer unit for executing video processing upon an input video obtained from the video obtaining unit, an encoding unit for executing an encoding process upon basis of a result of the processing within the camera image recognizer unit, thereby producing the video data, and wherein the monitor apparatus comprises a decoding unit for decoding the video data, and an image recognizer unit for selecting a decoding means of the decoding unit, upon basis of the result of processing of the camera image recognizer unit.

4 Claims, 8 Drawing Sheets

FIG. 4

| 501 | 502 | 503 | 504 |
|---|---|---|---|
| CLASS.1 | OBJECT INF. | DECODING CONDITION | IMAGE RECOGNITION EXECUTING CONDITION |
| CLASS.1 | OBJECT INF. | DECODING CONDITION | IMAGE RECOGNITION EXECUTING CONDITION |

VIDEO MONITORING SYSTEM

BACKGROUND OF THE INVENTION

The present invention relates to a video monitoring system for detecting an invader from video, which is obtained from an image pickup apparatus, such as, a camera, etc.

A video monitoring system, having a function of detecting a moving article, such as, a human being or a vehicle, etc., for example, appearing in a monitoring area, from video obtained from a camera, through video processing thereof, has further a function of recording only the video in which the moving article appears, and or a function of presenting an alarm icon on a display device, with using the result of detections, or it can call an attention of a watchman with buzzing a buzzer, therefore it is helpful for reducing load of a watching or observation job, conventionally necessitating a confirming operation by the watchman, always. Also, such video monitor system enables to use the video recorded, for the purpose of proving a crime after the fact, when an unfair practice occurs, such as, a larceny, etc.

In recent years, due to variety or diversification of crimes and/or an increase of the number of arrests of crimes, etc., consciousness of security rises up, in amass marketer, a banking organ, an office building, etc., for example, and an introduction of the video monitoring system is advanced or popularized. Recording capacity of a video recording apparatus also come to be large, and the set number of the cameras is increasing with provision of cameras at various positions, due to wide spread of a network camera or the like. For this reason, it is very difficult to pickup a criminal from the video recorded, through eye observation (i.e., visual examination) by the watchman, therefore demand goes up to be high for the function of assisting the observation job.

The videos obtained by the network camera are accumulated within a monitor center, etc., while compressing the videos with using an encoding means, which is built in the network camera, or the monitoring equipment. In the following Patent Document 1 is disclosed a technology for compressing the videos effectively, in such an instance, i.e., compressing the videos but with high definition of an area having a movement or motion therein, on which an attention will be made. Within the technology disclosed in the Patent Document 1, there is adapted a function called ROI (Region of Interest) of JPEG 2000, one of the video encoding means.

[Patent Document 1] Japanese Patent Laying-Open No. 2004-200739 (2004)

BRIEF SUMMARY OF THE INVENTION

The video monitoring system is constructed with a plural number of cameras and a controller apparatus and a recorder apparatus, but calculation resources assigned to the network cameras are limited, and it is difficult to achieve video recognition with high degree in many cases thereof. Also, when trying to conduct a tracing process and/or a search process bridging over the plural number of cameras, then it is preferable to execute it/them in the apparatus on the monitor center side, to which the videos are collected intensively, and in this instance, it is necessary to change video data encoded, after being decoded once, into data suitable for a video recognition process. In case where videos of the plural number of cameras are collected intensively to the monitor center, it is necessary to execute the decoding process, upon an enormous volume of videos, and then there occurs a problem that a processing load goes up. In this manner, within the video monitoring system, there is the problem to be dissolved, i.e., achieving a desired process, effectively, among the limited processing resources thereof.

With the present invention, accomplished by taking the problems mentioned above into the consideration thereof, an object thereof is to provide a video monitoring system for enabling to lower or reduce the load of decoding process on the supervisor center side.

According to the present invention, for accomplishing the object mentioned above, there is provided a video monitoring system, wherein a monitoring apparatus comprises a decoder unit for decoding video data transmitted from a camera, and an image recognizer unit for selecting the decoding means of the decoder unit, upon basis of a result of video processing within the a camera image recognizer unit.

With the present invention mentioned above, in the image recognizer unit on the monitor apparatus side, since it is possible to select the decoding process depending upon recognition information on the camera side, and therefore achieving the video monitoring system having preferable efficiency thereof.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein:

FIG. 4 is a view for explaining information description for selecting a decoding process and a video process, in the embodiment shown in FIG. 1;

DETAILED DESCRIPTION OF THE PREFERRED EMBODIMENTS

Hereinafter, embodiments according to the present invention will be fully explained by referring to the attached drawings.

Figure 1:
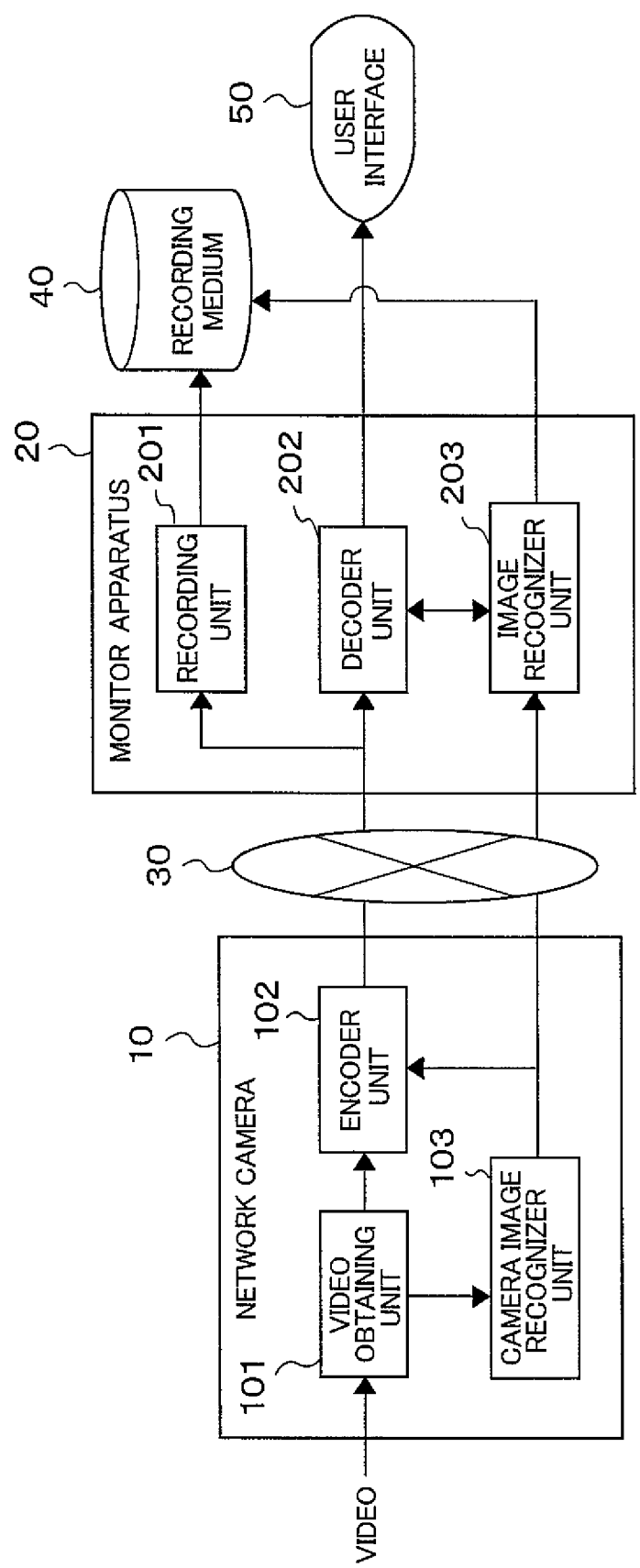
FIG. 1 is a view for showing the entire configuration of a video monitoring system, according to an embodiment of the present invention.

FIG. 1 shows the configuration of a video monitoring system of a network type, according to an embodiment of the present invention. In the present embodiment, hardwires are built up with an electronic computing system, including a CPU, a memory, a LSI, etc., thereby executing various kinds of functions. Herein, each function, being built up with, not a unit of the configuration of hardware, but hardware and software of those, is presented by a block.

The video monitoring system comprises a network camera 10 and a monitor apparatus 20, wherein videos and parameter information are transmitted through a network 30, from the network camera 10 to the monitor apparatus 20. As the network 30 may be used a personal circuit, which is owned by a user, or a public network. Also, communication protocol, etc., may be anything, as far as the present embodiment can be achieved. The video transmitted from the network camera 10 to the monitor apparatus 20 are reserved on a recording medium 40. As such the recording medium 40 may be applied an electronic recording medium, such as, a hard disk drive, a flash memory, etc. Also, within the present system are provided an RGB monitor output, and a data output through the network, and parameter setup is executed by means of a user interface 50. An input within the user interface 50 is assumed to be an inputting function of input/output equipment, such as, a mouse and/or a keyboard, and that of the monitor apparatus 20

The network camera 10 comprises a video obtaining portion or unit 101 for obtaining a video signal obtained from an image pickup apparatus, which is built up with an image pickup medium, such as, a camera lens and CMOS or CCD, etc., an encoding portion or unit 102 for encoding the video signal obtained into a predetermined data, such as, MPEG (Moving Picture Expert Group) or JPEG (Join Photographic Expert Group), etc., and a camera video recognizer portion or unit 103 for executing a predetermined video recognition process upon the video data for use of video recognition, which is obtained from the video obtaining unit 101.

The monitor apparatus 20 comprises a recording portion or unit 201, for reserving the videos transmitted from the network camera 10, including additional information, such as, time information, etc., for them, onto the recording medium 40, a decoding portion or unit 202 for executing a conversion process into a monitor output, which is aimed to be monitored on the user interface 50, or data suitable, which is suitable for executing the video recognition process thereon, and an image recognizer portion or unit 203 for executing the image recognition process within the monitor apparatus 20.

The video obtaining portion or unit 101 outputs the video signal obtained from the image pickup apparatus as a video signal, being suitable for the encoding unit 102, which will be mentioned later. Also, the video obtaining unit 101 produces video data, which is suitable to be processed in the camera image recognizer unit 1-3.

Herein, the video data an be obtained in the form of video data of one-dimensional arrangement or two-dimensional arrangement, and on this video data may be treated the processes, such as, a smoothing filter, an outline emphasizing filter, a density conversion, etc., for example, for reducing ill influences due to, such as, noises and flickers, etc., as a pre-process thereof. It is also possible to select a data format, such as, RGB color or a monochromatic, or the like, depending on a way of using thereof. Further, for reducing a processing cost, a contraction or reduction process may be treated on the video data with a predetermined size. Hereinafter, for easily understanding thereof, explanation will be made on the encoding process and the video process, by a unit of one frame.

In the encoding unit 102, it is possible to set up a encoding means by the setup means, with applying a standard encoding regulation, such as, MPEG (Moving Picture Expert Group) or JPEG (Join Photographic Expert Group), H.26x, etc., for example. The encoding unit 102 receives the video signal obtained from the image obtaining unit 101, and outputs the video signal in the form of the data in accordance with a predetermined encoding regulation.

In the camera image recognizer unit 103, a predetermined video process is executed upon the video data obtained from the image obtaining unit 101. In the camera image recognizer unit 103 is detected an event generating within the video. This event detecting process will be explained by referring to FIG. 2, in particular, when detecting a movement or motion in the video with using a background difference calculus, within the present embodiment. Herein, it is assumed that the video data obtained from the video obtaining unit 101 is an input video. Motion detection is presumed that the background video is held for comparison with the input video. The background video is a video, not including a moving article(s), within the input video. The background difference calculus, through compassion between the input video and the background video, considers a portion, having a change to the background video, to be a moving article, such as, a human being, etc., i.e., the movement of the video. With this means, it is possible to detect the movement within the video as an event.

Figure 2:
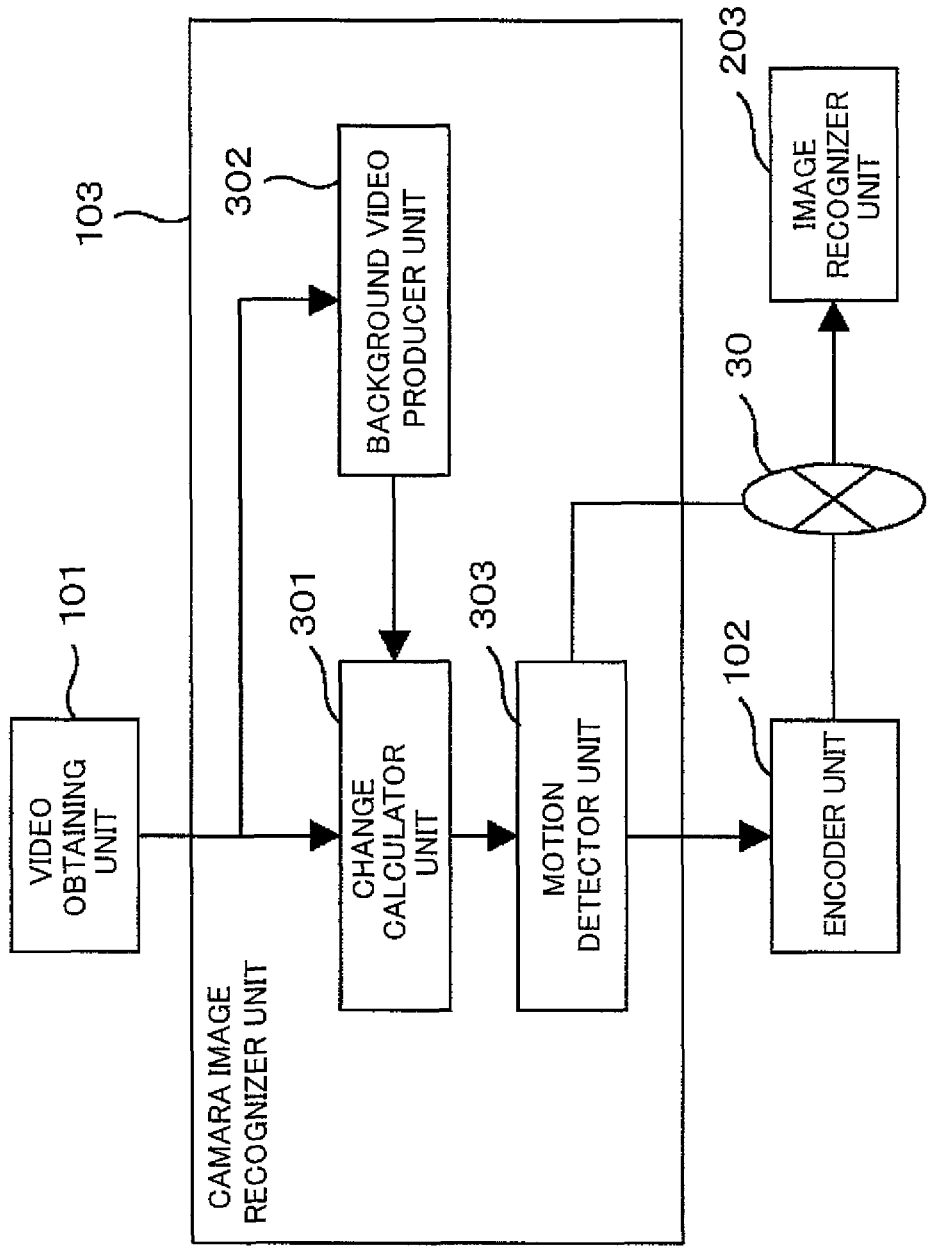
FIG. 2 is a view for showing a camera video recognizer unit within the embodiment shown in FIG. 1.

In even detection of the camera image recognizer unit 103 shown in FIG. 2, the background video is produced in advance, within the background video producer unit 302, with the video transmitted by the video obtaining unit 101, and is held. The background video producer unit 302 sets a portion having no motion as the background video, or produces the background video from time sequential data of the input video, but any one of the cases does not matter with. This background video and the input video are compared with, in a change calculator portion or unit 301. The result thereof is determined on whether it is a motion or not, within a motion detector means or unit 303, and the video data, including results of an area of the motion and a magnitude thereof, is transmitted to the image recognizer unit 203 within the monitor apparatus 20, through the encoding unit 102 and the network 30.

In the event detecting process within the camera image recognizer 103, according to the present embodiment, it is possible to change each means or unit for various kinds of events, and thereby to detect the event. The event may be any one, as for as it is an event detectable by the video processing, for example, a face (including a specific face), a vehicle, a moving person, a predetermined wear or a person having a property, such as, sex or the like, a crime or a suspicious action, remain of a baggage, etc. Further, it may be an event obtained from an external module, such as, a infrared sensor, a radar sensor, an audio sensor, etc., or an event generating from an apparatus for managing coming into/back a room.

Figure 3A:
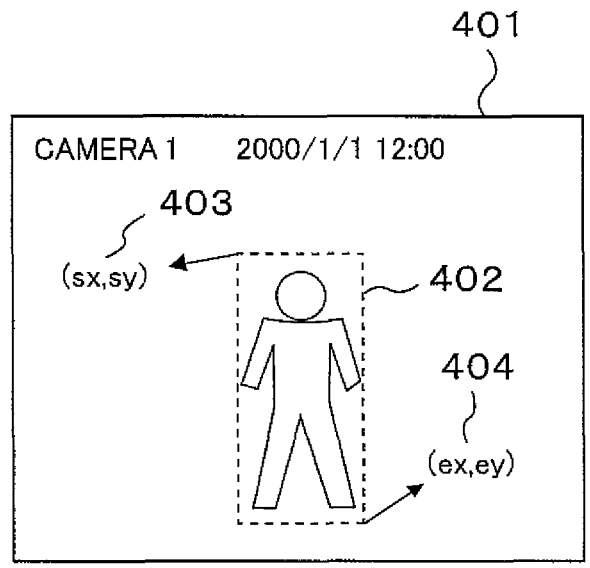
FIGS. 3A and 3B are views for explaining information obtained within the camera video recognizer unit.

Explanation will be given on description of characteristics of the video data obtained from the network camera 10, which is conducted by the camera image recognizer unit 203 within the monitor apparatus 20, by referring to FIGS. 3A and 3B. A reference numeral 401 in FIG. 3A shows an example of the monitor output, and the video processing thereof. An event detected area 402 of, such as, an article detected, etc., is presented, as is shown in the figure, by such a rectangular in contact with event detected area. In this instance, coordinates 403 of a start point obtain (x-coordinate of start point, y-coordinate of start point) and coordinates 404 of an end point obtain (x-coordinate of end point, y-coordinate of end point) are obtained as the information thereof.

Figure 3B:
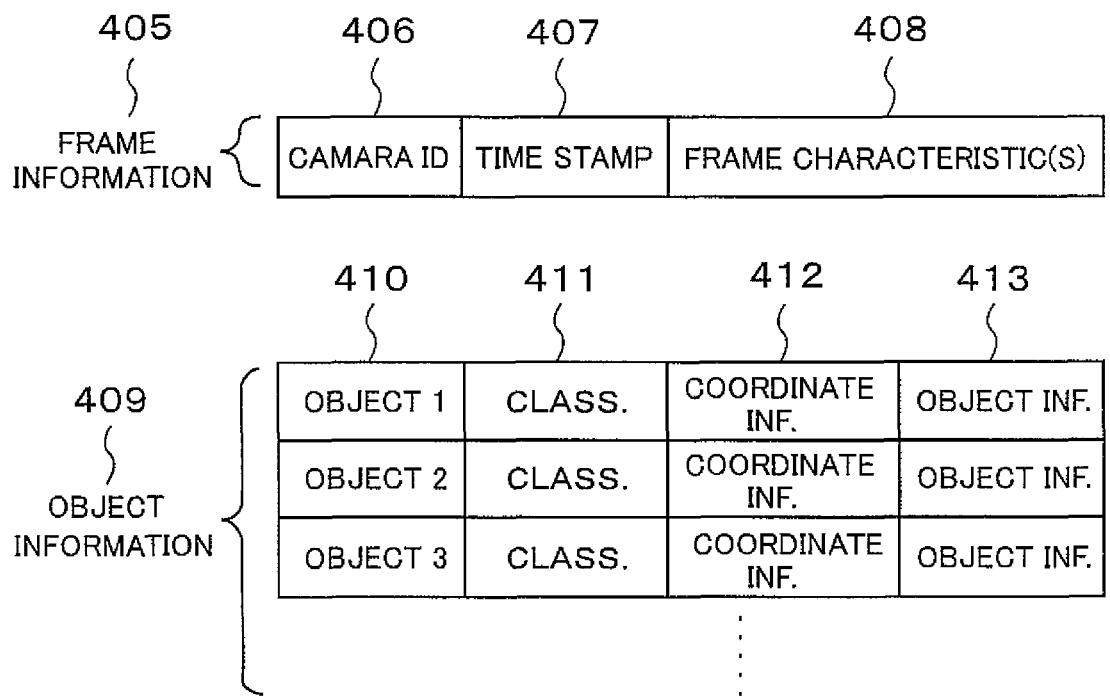

FIG. 3B shows an example of the description of characteristics. Like frame information 405 of the screen as a whole, the camera ID 406, a time stamp 407 (i.e., frame information of time), and a frame characteristic 408 are described. The camera ID 406 is set up as an ID number for each camera, when the system is set up. This is because of the purpose of identifying the camera with an IP address, number or mark of the network. The time stamp 407 is used for achieving synchronization between the network cameras 10. In case when managing the data transmitted from the network camera 10 by the monitor apparatus 20, it is recorded on the recording medium 40 while obtaining the synchronization of time, thereby to be used in searching, etc.

The frame characteristic 408 is a characteristic amount of the video frame as a whole thereof, and it indicates the characteristic, such as, brightness, a texture, or a number of objects, etc. In more details, it is a color histogram of the video as a whole, a brightness gradient histogram, or information of time-sequential changes due to change of weather or change of lightning, and further it may also include a number of objects (for example, persons, articles, faces, vehicles passing by, etc.) Also, herein, it can also include, not limited to the video information, but audio information, such as, noises or screams, human voices, etc.; i.e., any kind of information can be described as far as it can be obtained as information by unit of a frame.

Each of the object information generating within the video frame is described in the form of object information 409. In an object number 410 is described the ID number of the object, for identifying the object generating within the camera. In a classification 411 is described a description of a person, a human face, an article, or action, etc., for classifying noticeable sort with the image recognition. Also, into coordinate information 412 are described start-point coordinates and end-point coordinates of an object corresponding to the start point and the end point of the event detected area mentioned above. In this may be also included time-sequential movement of the object, and/or motion vector or changes of the coordinate information of event. The object information 413 includes detailed information of the information, which is described in the classification 411, the characteristic amount of face data if it is face detection, a degree of detection confidence of the face detection (i.e., a degree of seeming to be a face), or the magnitude of motion (i.e., distribution of the motion vectors). Also, a size, a gravity center, and/or a moment of the rectangular of the event detected area 402. It is assumed that the characteristic amounts obtained through those video processing, etc., are described for each of the objects.

Figure 5:
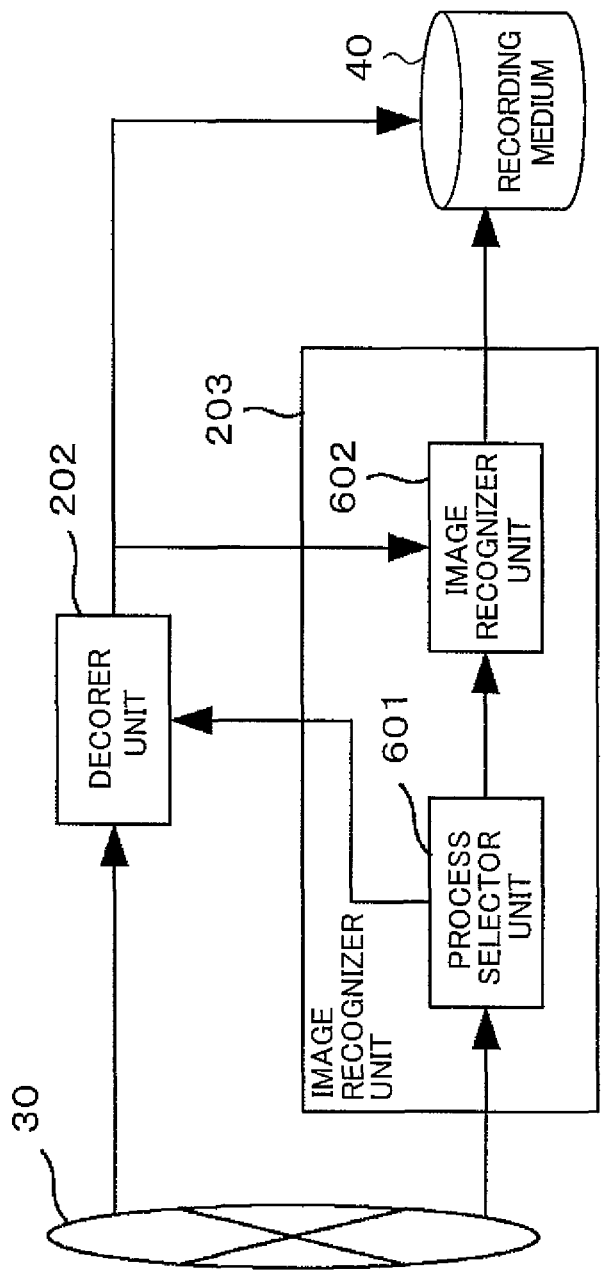
FIG. 5 is a view for showing the video recognizer unit, within the embodiment shown in FIG. 1.

The characteristic description of video data, which is obtained within the image recognizer unit 203, is utilized in decoding process when conducting the image recognition on the monitor apparatus 20 side. Explanation will be made on the operation of this instance, by referring to FIGS. 4 and 5. In the video processing within the monitor apparatus 20, detailed recognition is conducted upon the article, on which the video processing was executed in the camera image recognizer unit 103 on the network camera 10 side, in accordance with a predetermined condition, on the monitor apparatus side. A process selector means or unit 601 sends a decoding condition 503 to the decoding unit 202, from combinations of the classification 501 and the objection information 502. In the decoding condition are included the information, such as, a position where video should be restored, a resolution and a picture quality of video, a frame rate, a bit rate, etc., for example, and with an aid of one or several of those, it is possible to select the decoding means or unit. However, data for indicating correspondence between the combination of the classification and the object information, and the decoding condition and the condition for executing image recognition, as is shown in FIG. 4, is stored or registered within the monitor apparatus 20, in advance.

The decoding unit 202 executes the decoding process upon basis of the decoding condition 503 and the coordinate information 412. For example, setup can be made, such as, the restoring area is {start coordinates (sx,sy)–end coordinates (ex,ey)}, the resolution is ¼ of the present video size, and a standard picture quality, etc. The video data decoded is sent to the image recognizer unit 602, and the image recognizer unit 602 executes the process upon basis of an image recognition executing condition 504. Herein, the process to be executed is changed depending upon the combination between the classification 501 and the object information 502. For example, if the area is classified as the face detection area, it is determined that the process is executed on the video of a high resolution, so as to obtain the detailed information, and from that information, the image recognition executing condition 504 is selected for identifying an age or sex, and tag information is obtain, etc., i.e., those correspond to the processes of a rear stage. Processing results of the image recognizer unit 602 are transmitted to the recording medium 40, to be reserved in the form of a tag of video, together with the video information, therein. In this case, if reserving the camera ID 406 and the time stamp 407, too, at the same time, they can be used in making a search at time thereafter and/or a search with an aid of the camera position.

Figure 6:
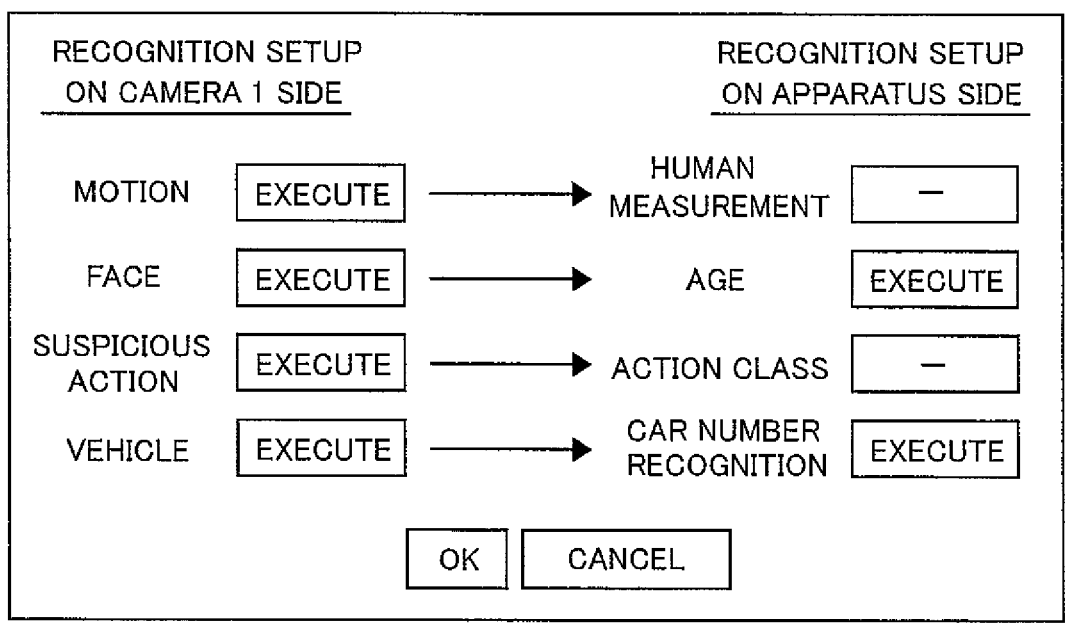
FIG. 6 is a view for showing a setup screen of a video recognition functions.

Next, a method for determining the video process will be explained, by referring to FIG. 6. With setting up of the video processing condition, it is executed through the user interface 50, with using a video setting output f to the monitor and/or an inputting function of the monitor apparatus 20. For the process in the camera side, it is possible to set up a recognition executing condition of the monitor apparatus 20 side. For example, it is possible that, while executing the face detection on the camera side, as was mentioned above, on the monitor apparatus side is executed the function of detecting the detailed information, such as, an age estimation, etc. With allowing the monitor apparatus side to execute the processes of the rear stage while stopping the processes for the camera side up to the fundamental recognition functions, it is possible to decentralize the load of the processes.

With the present embodiment, selection of the encoding process and the image recognition process is made upon basis of the predetermined process selecting condition; but this can be also determined, uniquely, by the user through the user interface 50; i.e., an encoding process with a fixed resolution and frame rate and/or a desired image recognition process can be made upon a predetermined area.

According to the present embodiment, it is also possible to execute the predetermined process within the decoding unit 202, upon the coded data, which is stored or reserved on the recording medium 40. With setting the restoring area as {start coordinates (sx,sy)–end coordinates (ex,ey)}, it is possible to execute while selecting the decoding condition 503, such as, the frame rate and the resolution, and the image recognition executing condition 504.

Figure 7:
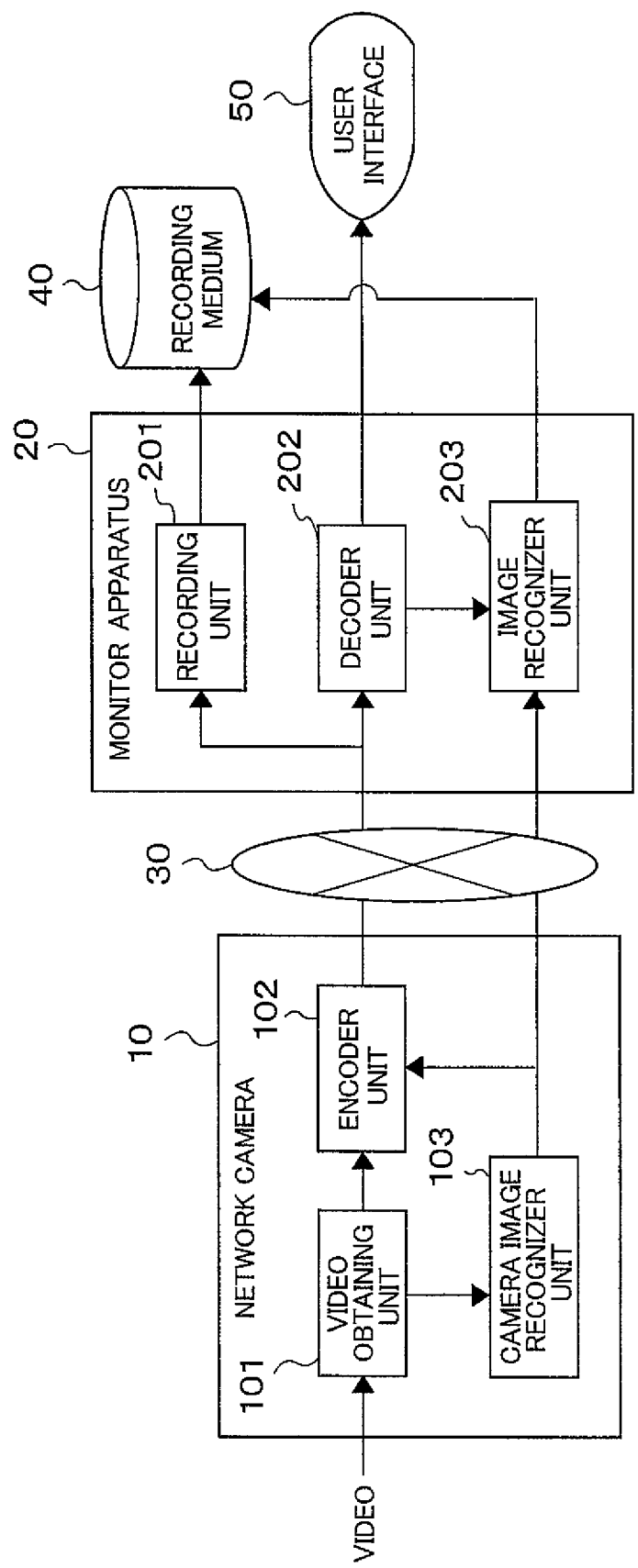
FIG. 7 is a view for showing the entire configuration of a video monitoring system, according to other embodiment of the present invention.
Figure 8:
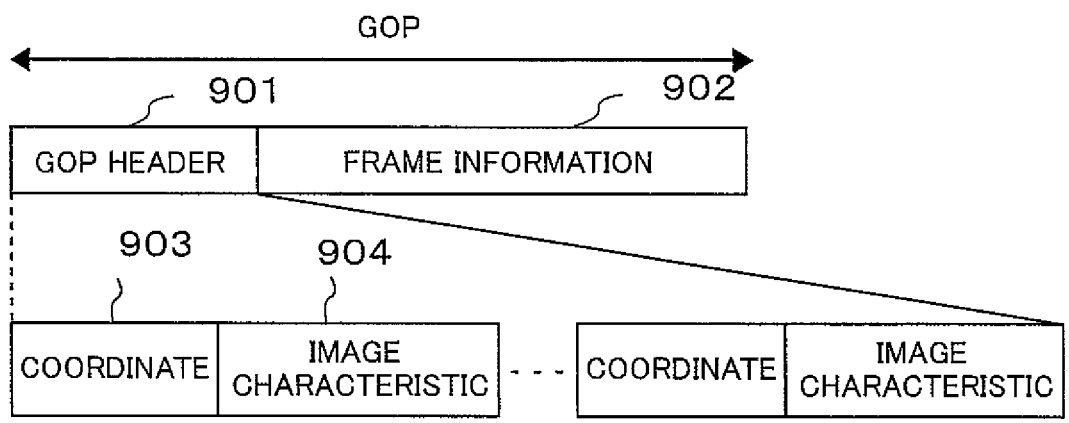
FIG. 8 is a view for showing a method for describing frame information, in the embodiment shown in FIG. 7.

FIG. 7 shows a video monitoring system, according to other embodiment of the present invention. Herein, means or a unit for transmitting the image recognition information differs from that of the embodiment mentioned above, but others are same to those of the embodiment mentioned above. In the present embodiment, the result of processing in the camera image recognizer unit 103 is written into a header file of the video information of the encoding unit 102, and in the decoding 202 is executed an instruction of processing from the header file to the image recognizer unit 203. As is shown in FIG. 8, the information is described in a GOP (Group of Pictures) header 901, such as, a gathering of data when encoding the video, for example. Together with the GOP header 901 is stored the video information in frame information 902. Herein, it is possible to describe coordinates 903 and image characteristics 904 in a header area inside the GOP. In the information, as similar to the example shown in FIG. 3, there can be described the information, such as, the coordinates of an object and a texture, etc., the confidence degree information, such as, through the face detection, etc. The image recognizer unit 203 executes the video process upon basis the condition described in FIG. 4, in the similar manner to that of the previous embodiment.

Figure 9:
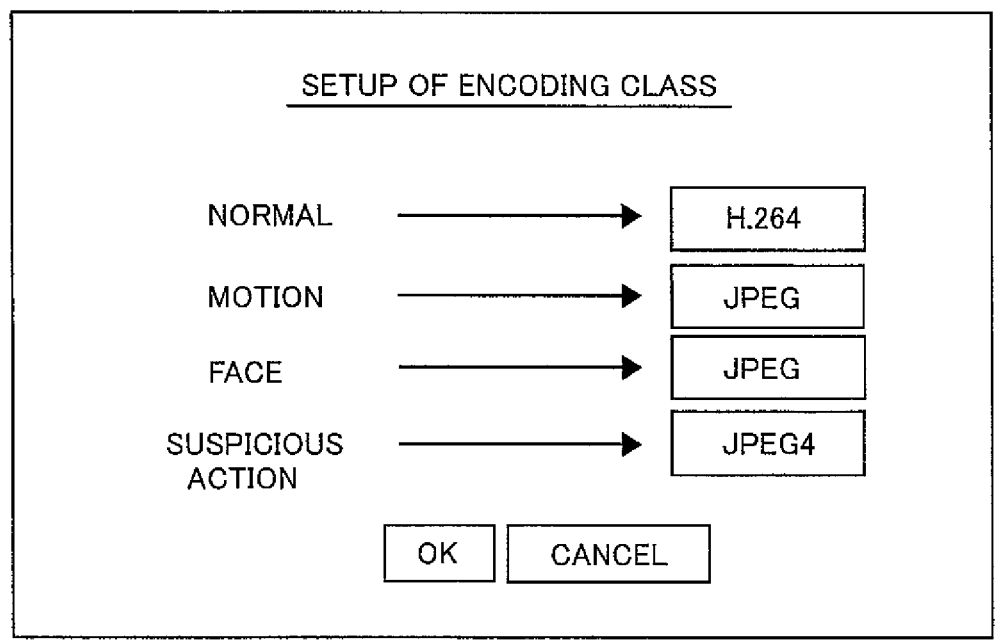
FIG. 9 is a view for showing a setup screen of classification of encodings, in the embodiment shown in FIG. 7.

In case of the system configuration of network type, having the encoding means or unit therein, it is preferable that a plural number of encoding means or units can be selected depending on the mode of using the video on the monitor apparatus 20 side. For example, if wishing only to record the video, then selection is made on the encoding means or unit having a high compression rate, and if wishing to execute the process by a unit of one (1) piece of video, JPEG as the encoding means or unit of still pictures. With this, a proper use can be achieved depending upon the condition, such as, handling of the still pictures is easy than the data of a video stream type or the like. A setup screen for encoding classification shown FIG. 9 aims to select a predetermined encoding method with respect to each of the characteristic amounts.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A video monitoring system, comprising:
a camera; and
a monitor apparatus, to which video data from said camera is transmitted, wherein
said camera comprises:
    a video obtaining unit which is configured to obtain a signal from an image pickup device;
    a camera image recognizer unit, which is configured to execute video processing upon an input video obtained from said video obtaining unit;
    an encoding unit, which is configured to execute an encoding process upon basis of result of the processing within said camera image recognizer unit, thereby producing said video data, wherein
said monitor apparatus comprises:
    a decoding unit, which is configured to decode said video data: and
    an image recognizer unit, which is configured to select a decoding means of said decoding unit upon basis of said result of processing of said camera image recognizer unit;
wherein said video monitoring system comprises a video processing condition setting unit for setting up video processing conditions executed by each of said camera image recognizer unit and said image recognizer unit, respectively; and
wherein said camera image recognizer unit and said image recognizer unit execute video processing based on each video processing condition set up by the video processing condition setting unit;
wherein said camera image recognizer unit produces frame information and object information, in each video frame;
wherein a characteristic of said video frame is described in said frame information and each object information, which is produced in said each video frame, is described in said object information; and
wherein said image recognizer unit has a process selector unit for selecting a decoding means of said decoding unit, from said frame information and said object information, which are transmitted from said camera image recognizer unit, and said decoder unit selects at least one of a position to be restored, a resolution, a frame rate, and a picture quality.

2. The video monitoring system, as described in the claim 1, wherein said image recognizer unit has the image recognizer means for executing predetermined image recognition upon said video data, which is decoded in said decoder unit.

3. The video monitoring system, as described in the claim 1, wherein said result of the processing is described in said video data.

4. The video monitoring system, as described in the claim 1, wherein it is possible to select one of a plural number encoding means in said encoding unit, and setup of said encoding units is made upon basis of a result of the processing of said camera image recognizer unit.

* * * * *